United States Patent
Platon et al.

(10) Patent No.: US 8,575,817 B2
(45) Date of Patent: *Nov. 5, 2013

(54) AXIAL AIR GAP MACHINE HAVING STATOR AND ROTOR DISCS FORMED OF MULTIPLE DETACHABLE SEGMENTS

(75) Inventors: Mihai C. Platon, Burnaby (CA); Virgil F. Young, Oakland, OR (US)

(73) Assignee: Clean Current Limited Partnership, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,293

(22) Filed: Jun. 27, 2012

(65) Prior Publication Data

US 2012/0262023 A1     Oct. 18, 2012

Related U.S. Application Data

(63) Continuation of application No. 12/376,282, filed as application No. PCT/CA2007/000181 on Feb. 7, 2007, now Pat. No. 8,222,792.

(60) Provisional application No. 60/835,675, filed on Aug. 4, 2006.

(51) Int. Cl.
| | |
|---|---|
| *H02K 1/22* | (2006.01) |
| *H02K 1/04* | (2006.01) |
| *H02P 9/04* | (2006.01) |
| *F03B 13/00* | (2006.01) |

(52) U.S. Cl.
USPC .................. 310/266; 310/216.109; 310/12.09; 310/126; 310/112

(58) Field of Classification Search
USPC .............. 310/268, 102, 216.109, 266, 12.09, 310/126, 112
See application file for complete search history.

(56) References Cited

U.S. PATENT DOCUMENTS

| | | | |
|---|---|---|---|
| 3,922,574 | A | 11/1975 | Whiteley |
| 4,291,455 | A | 9/1981 | Schnyder |

(Continued)

FOREIGN PATENT DOCUMENTS

| | | |
|---|---|---|
| EP | 0896415 A1 | 2/1999 |
| GB | 2123618 | 2/1984 |

(Continued)

OTHER PUBLICATIONS

WIPO, "PCT WO 2008/014584 International Search Report", 4 pages, May 1, 2007.

*Primary Examiner* — Terrance Kenerly
(74) *Attorney, Agent, or Firm* — Dean Palmes IP Law/IProperty Inc.

(57) ABSTRACT

Rotor and stator segments for a generator and motor apparatus are provided. The apparatus includes: a pair of parallel, spaced apart stator segments, each stator segment comprising a stator winding set; and a rotor segment slidably coupled to the pair of stator segments, the rotor segment comprising a magnet and being dimensioned to fit between the parallel, spaced apart stator segments. The apparatus may include a support structure, the rotor segment being slidably coupled to the support structure and the stator segment being attached to the support structure. The apparatus may be a rim generator, wind turbine generator or other electrical machine. The stator winding set includes a stator winding, and may include other electrical or electronic components, including possibly a power factor capacitor, direct current filtering capacitor, supercapacitor, and one or more diodes. The stator winding set may be encapsulated within the stator segment.

17 Claims, 10 Drawing Sheets

(56) References Cited

U.S. PATENT DOCUMENTS

| | | | |
|---|---|---|---|
| 4,464,592 A | 8/1984 | Major | |
| 5,185,545 A | 2/1993 | Veronesi | |
| 5,477,091 A | 12/1995 | Fiorina et al. | |
| 5,637,941 A | 6/1997 | Paweletz | |
| 5,814,914 A * | 9/1998 | Caamano | 310/216.047 |
| 5,982,070 A | 11/1999 | Caamano | |
| 6,037,696 A | 3/2000 | Sromin et al. | |
| 6,049,188 A | 4/2000 | Smith | |
| 6,919,654 B2 | 7/2005 | Harned | |
| 7,042,109 B2 | 5/2006 | Gabrys | |
| 7,525,229 B1 * | 4/2009 | Willig et al. | 310/156.03 |
| 8,222,792 B2 * | 7/2012 | Platon et al. | 310/266 |
| 8,358,046 B2 * | 1/2013 | Platon | 310/266 |
| 2005/0029877 A1 * | 2/2005 | Harned et al. | 310/12 |
| 2005/0179264 A1 | 8/2005 | Ganev | |
| 2010/0285702 A1 * | 11/2010 | Platon | 440/6 |
| 2013/0020888 A1 * | 1/2013 | Anthony | 310/52 |

FOREIGN PATENT DOCUMENTS

| | | |
|---|---|---|
| GB | 2379093 A | 2/2003 |
| GB | 2380332 A | 4/2003 |
| JP | 10-504699 | 5/1998 |
| WO | 83/02042 A1 | 6/1983 |
| WO | 01/06623 A1 | 1/2001 |
| WO | 03/094327 A1 | 11/2003 |
| WO | 2006/066740 A1 | 6/2006 |

* cited by examiner

AXIAL AIR GAP MACHINE HAVING STATOR AND ROTOR DISCS FORMED OF MULTIPLE DETACHABLE SEGMENTS

BACKGROUND OF THE INVENTION

1. Field of Invention

This invention relates to rotor and stator components of electrical generators and electrical motors and, in particular, to rotor segments and stator segments for a generator and/or motor.

2. Description of Related Art

Many electrical generators for generating direct current (DC) and alternating current (AC) electricity and many AC and DC motors have been developed. Some generators and motors include permanent magnets located along the circumference of a rotor mounted on a drive shaft and electrical wire windings or coils located along an inner side of an annular stator. An external force such as flowing air or water rotating the drive shaft and rotor induces electrical current in the coils, thereby generating electricity. When electrical current is passed through the coils, the resulting magnetic force on the permanent magnets causes rotation of the rotor and drive shaft, which acts as the output shaft of a motor.

U.S. patent application Ser. No. 10/506,931 (published on Apr. 21, 2005 as US 2005/0082938) to Schmidt et al. discloses a torque motor which includes an annular rotor comprising a rotor frame and permanent magnets mounted on it, and includes a stator frame with iron cores and electrical windings arranged thereon, characterized by the fact that the iron cores and the electrical windings are arranged in one or more independent stator segments, such that each stator segment is detachably joined to the stator frame. The stator and rotor are coupled by a bearing. However, the torque motor of Schmidt et al. is limited to the electrical components of electrical windings and iron cores in each stator segment. Schmidt et al. is also limited to a single-piece annular rotor, which impedes the manufacturing, assembly and transportation of electrical equipment having a large diameter rotor.

SUMMARY

The above shortcomings may be addressed by providing, in accordance with one aspect of the invention, rotor and stator segments for a generator and motor apparatus. The apparatus includes: a pair of parallel, spaced apart stator segments, each stator segment comprising a stator winding; and a rotor segment slidably coupled to the pair of stator segments, the rotor segment comprising a magnet and being dimensioned to fit between the parallel, spaced apart stator segments. The apparatus may further include a support structure, the rotor segment being slidably coupled to the support structure and the stator segment being attached to the support structure.

The rotor segment may be dimensioned to fit between the stator segments without contacting the stator segments. The magnet may be a permanent magnet. When the rotor segment is between the stator segments, the magnet may be oriented such that a North pole of the magnet is adjacent one of the stator segments and a South pole of the magnet is adjacent the other one of the stator segments. When the rotor segment is between the stator segments, the magnet may be angled relative to the stator winding at a skewing angle.

The apparatus may include a bearing for slidably coupling the rotor segment to the support structure.

The support structure may include a hub. The hub may have an inner hole through which a fluid such as water or air may pass. The pair of stator segments may be attached to an outer surface of the hub. The rotor segment may be slidably coupled to the outer surface of the hub. The bearing may be located between the rotor segment and the outer surface of the hub.

The support structure may include a rim. The pair of stator segments may be attached to an inner surface of the rim. The rotor segment may be slidably coupled to the inner surface of the rim. The bearing may be located between the rotor segment and the inner surface of the rim.

Each rotor segment may be encapsulated in an encapsulating material. Each stator segment may be encapsulated in an encapsulating material. The encapsulating material may be made of plastic, resin or other material, including material suitable for hermetically sealing electronic components. The encapsulating material may be a low friction material.

The stator segment may include a bracket for attaching the stator segment to the support structure. At least a portion of the bracket may be encapsulated within the encapsulating material. The bracket may include one or more apertures for receiving fasteners such as bolts, pins, rods, nails or screws, respectively.

The stator segment may include a stator core for supporting the stator winding. The stator core may include a central projection disposed within the stator winding. The stator core may include side projections disposed on either side of the stator winding. The stator segment may include a plurality of stator windings and the stator core may include a plurality of spaced apart projections disposed within the plurality of stator windings. The stator core may be made of a magnetic or ferromagnetic material. The stator core may have a curved surface. The stator core may have flat surfaces adjoined at right angles along straight edges.

The stator winding may have two terminal ends. The stator segment may include a pair of terminals connected to the terminal ends, respectively. One stator winding of one of the pair of stator segments may be electrically connected at one terminal end thereof to one terminal end of one stator winding of the other of the pair of stator segments.

The stator segment may include an output electrical component electrically connected to the stator winding. The output electrical component may be disposed within the encapsulating material. The output electrical component may be a capacitor. The capacitor may be an alternating current (AC) capacitor. The AC capacitor may be operable to compensate a power factor of the output of the generator. The capacitor may be a direct current (DC) capacitor. The DC capacitor may be operable to reduce ripple of a rectified voltage waveform. The output electrical component may be a diode. The stator segment may include a pair of diodes connected to the stator winding so as to rectify the AC output of the stator segment. The stator segment may include two diode pair arranged to form a diode bridge for rectifying the AC output to generate a DC output. The pair of diodes may be disposed within the encapsulating material.

The apparatus may include a rectifier circuit for rectifying the AC output of the apparatus to generate a DC output. The apparatus may include an inverter for producing AC power at a desired frequency and AC voltage from the generated DC output. The apparatus may include a DC-DC converter for converting from a first DC voltage to a second DC voltage different from the first DC voltage.

The apparatus may include a plurality of the pairs of parallel, spaced apart stator segments. The plurality of pairs may be attached to the support structure in substantially longitudinal alignment, including being longitudinally offset with respect to each other and/or in circumferential or tangential alignment, thereby forming a channel between opposed stator segments of respective pairs. The rotor segment may be operable to move through the channel in a first direction. The rotor segment may be operable to move through the channel in a second direction opposite the first direction. The rotor segment may be dimensioned to move through the channel without contacting any stator segment. The stator winding of each stator segment of the plurality of stator segments may be angled relative to the first direction. The stator segments may be connected to the support structure and/or connected to each other to form a stator having an outer circumference. The channel may be a closed, circumferential channel disposed tangentially along or adjacent to the outer circumference of the stator.

The apparatus may include a pair of seals disposed between the rotor segment and the pair of stator segments on either side of the rotor segment. The pair of seals may be operable to maintain a lubricant within the channel between the rotor segment and the pair of stator segments. The rotor segment may be slidable relative to the pair of seals. The stator segment may be slidable relative to the pair of seals.

The apparatus may include a blade attached to the rotor segment, the blade being operable to cause the rotor segment to move through the channel when the blade is subjected to the force of a fluid flow, including a water or air flow. The blade may be attached to a side of the rotor segment opposite the bearing. The blade may be attached to a side of the rotor segment adjacent the seal.

The apparatus may include a plurality of rotor segments slidably coupled to the support structure and substantially longitudinally aligned, including being longitudinally offset with respect to each other and/or circumferentially or tangentially aligned, thereby forming a train of rotor segments operable to move through the channel. The train may be operable to move through the channel in a first direction, including moving circumferentially through the channel. The train may be operable to move through the channel in a second direction opposite the first direction, including moving circumferentially through the channel. The train may be operable to move through the channel without any contact between a rotor segment and a stator segment. The magnets of adjacent rotor segments of the train may have opposing orientations. The train may form an endless loop for movement within a closed channel. The rotor segments may each have a square, generally rectangular or arcuate shape, and the train may have a generally circular, including annular shape. The apparatus may include a plurality of parallel, spaced apart annular trains, which may be axially disposed to each other.

The apparatus may include a startup device to provide additional torque for rotating the rotor segment during initial startup. The startup device may include a pair of parallel, spaced apart rods or wires extending parallel to and along the train of rotor segments. The wires may form an endless loop. The startup device may include a plurality of parallel, spaced apart braces extending between the parallel wires for maintaining the separation between the wires. The wires and braces may be made of metal, such as copper, aluminum or brass. The wires and braces may be made of a composite material. The pair of wires may be disposed adjacent the magnets of the train of rotor segments. The startup device may include a plurality of pairs of parallel, spaced apart wires having braces extending therebetween.

A dual rim electrical axial modular machine, which is a modular, axial flux, double-sided, permanent magnet rotor, segmented stator, direct drive (no drive shaft), low speed multi-phase AC synchronous machine, may be operated as an electrical motor or electrical generator, and a version thereof may produce direct current.

The machine may in some variations have a generally circular shape resulting from geometric arrangements of stator armatures (or stator core), and rotor permanent magnet poles around the stator and rotor circumferences. In general, the stator may have a different number of outer edges than the rotor.

In operation (as a motor or as a generator) the rotor may spin about an axis which is common with the two-sided stator. The rotor permanent magnet segments may pass in front of or otherwise adjacent to the fixed stator armature segments.

The profile of armatures forming the stator segments may vary from a simple E-shape to generalized profiles calculated to focus optimally the magnetic flux density lines induced by rotor motion.

The stator armature windings may be connected per each phase in parallel, series or series-parallel connections. Depending on the connection mode, the same mechanical arrangement of the stator and of the rotor may be connected to (as a generator) or from (as a motor) power sources of different nominal voltages. In general, the windings of the stator armatures are permitted to be decoupled from one another thermally and magnetically. These multi-phase AC machines may also have their phase-windings decoupled magnetically and thermally. This decoupling feature enhances the fault-tolerance of the machine, and permits redundancy to be built into the machine such that the machine may be operated with a desired degree of redundancy.

The modular fault-tolerant construction of electrical machines brings significant benefits such as: (i) a machine may be assembled from pre-wound stator segment sub-assemblies, which is conducive to low, high-volume manufacturing; (ii) since the phase windings are essentially isolated magnetically, thermally and physically, their fault tolerance is significantly higher, which is a major consideration for environment-critical applications, such as extraction power from tidal currents. In general, it is possible to run the machine with a number of electrically decoupled (or damaged) armature windings on different phases.

The stators of the machine may also incorporate capacitors for power factor compensation which improve the active power deliverable (or received) to machine terminals. The incorporation of power factor compensation capacitors are operable to compensate individual stator armatures or groups of them.

The number of armatures, the number of phases (in the case of an AC machine), the number of permanent magnet poles, the rate of conversion from mechanical angular speed, which may be expressed in rotations or revolutions per minute, to frequency of an AC output, and the geometrical positioning and sizes of armatures and poles on the double-sided stator and rotor, respectively, may be mathematically related in accordance with formulas.

The machine is dual. Thus, on a similar dual-stator and rotor hardware configuration, both AC (including multi-phase AC) or DC electromagnetic conversion systems may be accommodated in different versions thereof. The DC version of the machine may comprise DC filtering capacitors, which may be incorporated in a manner similar to the integration of power factor compensation capacitors in the AC version of the machine.

Cogging forces, and potentially associated power loss during operation of the machine due to the inclusion of permanent magnets into the machine, may be mitigated, such as by magnet skewing with respect to their radial positions indexed along the rotor circumference. The skewing may be asymmetric.

The machine may include a hybrid rotor combining the starting characteristics of an asynchronous machine (line-starting torque) and a synchronous machine (zero-starting torque), so as to obviate the need for complicated algorithms and/or the incorporation of sophisticated power electronics, which might otherwise increase the costs of such a permanent magnet synchronous machine with no starting torque and reduce its reliability or, in some cases, usefulness. The hybrid rotor may include permanent magnets (synchronous excitation) and rim-cages (asynchronous excitation) interspersed along the rotor circumference. In the rotor rim cross section, the relative position of rim-cages and permanent magnets may vary for different versions of the machine. The rim-cages may include linear, arcuate or planar sections formed by radial bars extending between two concentrically disposed rings, in which such parts may be made of electrical conductive materials. In an exemplary embodiment, an axial-flux double-sided machine includes two asynchronous starting rims, each of which is associated with one side of the embodiment. The asynchronous winding rims are concentric to and incorporated into the permanent magnet rotor which provides the synchronous character to the embodiment. Additionally or alternatively, different relative positioning (including skewing) of the rim windings and the permanent magnet excitation inside the same composite rotor may be present in the embodiment. The two asynchronous starting rims may be sectored along the machine's circumference. Parts of a rotor's circumference may be equipped with starting rims and other parts of the same or different rotor may include permanent magnets.

The machine may have a direct drive (no drive shaft) and, in different versions, bearings may act at the rotor rim and on double-side stator rim or stator jointly enclosure. A direct drive rim machine is conceptually different from a shaft driven machine.

In fluid environments the machine may integrate one or more lubricated bearings with the composite stator and rotor (which include the armatures and excitations, respectively).

The machine is suitable for high-diameter low-speed (and high-torque) applications. The modular feature of the machine addresses the challenge of manufacturing a large diameter machine. Both the double-sided stator and the rotor may be built from modular stator parts and modular rotor parts. Each modular stator part may include a specifiable number of circuit elements such as armatures, wires, power factor compensation capacitors. Each modular rotor part may include a specifiable number permanent magnets and/or rim-cages loops. The modular stator and modular rotor parts can be manufactured independently with a certain tolerance (typical to the large diameter of the machine) and then mechanically assembled together to provide the full machine. Electrical interconnectivity between the modular stator parts can be performed after final assembling of stator, as well as for modular rotor parts of the rotor.

One version of a very large diameter machine operating at very low speeds may multiply locally (round about given positions of the stator-(fixed) and rotor-(mobile) rims) the electrical frequency resulted from very low mechanical angular speed. This feature may be achieved by using a large number of the small armatures grouped on each circular sector of the stator rim (and correspondent smaller permanent magnets on the rotor rim), instead of using only one armature (and/or, permanent magnet) per rim sector.

One exemplary embodiment of the machine may be used for extracting power from ocean tides. In this version, a direct drive (no shaft) rim generator comprising a magnet race at the rotor rim and fixed stator coils in the machine housing converts the mechanical power from the blades of a turbine into electrical power. The rotor rim is connected to the tips of blades. The stator coils are arranged on a double-sided stator are separated from the rotor rim by a water gap. The same double-sided stator supports the bearing system of this tidal turbine generator version.

Another exemplary embodiment of the machine is a low speed, high diameter generator adapted for extracting energy from wind and for its conversion into electrical power. In accordance with this embodiment, a wind turbine may be built on the rim of a hub having a central hole with blades attached to the outside of the rim generator housing. The hole improves blade efficiency. A possible construction of this turbine arrangement may include bearings, generator, nacelle and a tower. A version of the wind turbine embodiment having a large nacelle and no central hole may provide additional room in the nacelle for equipment, such as power conditioning equipment.

The inclusion of segmented stators may result in specific advantages in manufacturing and maintenance, including advantages for high diameter low speed applications.

The direct drive (no drive shaft) feature may be implemented in a machine using bearings (of different types) arranged on the stator frame and rotor. Advantages of direct drive include rendering possible the use of the double-sided axial configuration in applications where usage of shaft is not possible or not desired due to structural challenges. The use of the direct drive (no drive shaft) feature, including use of the direct drive features in machines of large diameter, allows (by stator fragmentation) low speed and high torque applications to operate at grid electrical frequency, and at various levels of voltage across the machine terminals and current through the stator windings.

Decoupling (modularity) may be achieved by providing each phase independent from the other, and may be achieved by providing the individual parts of one phase (e.g. armatures connected in parallel) independent from each other.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In drawings which illustrate by way of example only embodiments of the invention.

DETAILED DESCRIPTION

Figure 1:
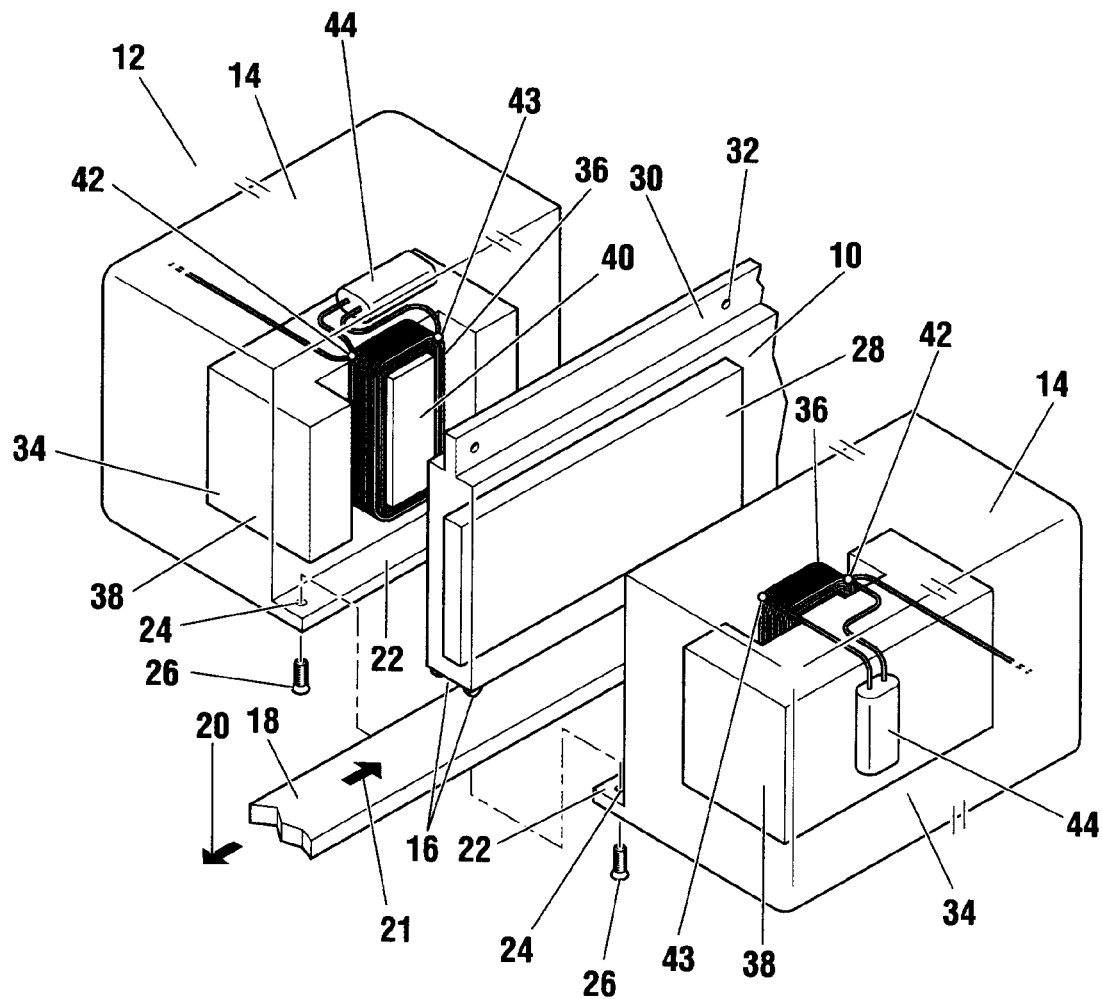
FIG. 1 is a perspective view of a rotor segment disposed between a pair of stator segments and slidably coupled to a support structure according to a first embodiment of the invention, showing by cut-outs a magnet disposed within the rotor segment and a stator winding set disposed within each stator segment.

Referring to FIG. 1 and in accordance with a first and preferred embodiment of the invention, in a generator and motor apparatus, a rotor segment 10 is shown disposed between a pair 12 of parallel, spaced apart stator segments 14. Bearings 16 are positioned between the rotor segment 10 and a support structure 18. The bearings 16 permit the rotor segment 10 to move relative to the stator segments 14 in the directions indicated by the arrows 20 and 21. FIG. 1 shows the stator segments 14 unattached to and separated from the support structure 18. However, a stator bracket 22 extends from each stator segment 14 for attaching the stator segment 14 to the support structure 18. The bracket 22 may include apertures 24 for receiving one or more fasteners, such as the fastener 26 shown in FIG. 1, or other fastening techniques or methods may be used to attach the stator segment 14 to the support structure 18. When the stator segments 14 are attached to the support structure 18, the dimensions of the support structure 18 permit the rotor segment 10 to fit between the stator segments 14 without contacting either stator segment 14. In typical applications incorporating the rotor segment 10 and the stator segments 14, which are described further below, the rotor segment 10 fits radially and axially between the stator segments 14.

The rotor segment 10 includes a magnet 28, which is made visible by a cut-out illustrated in FIG. 1 and is preferably a permanent magnet. The magnet 28 is preferably surrounded by a non-magnetic material such as plastic, rubber, encapsulating resin, low friction material, or a combination thereof. The magnet 28 may be encapsulated within the rotor segment 10, including hermetically sealing the magnet 28 within the rotor segment 10. By way of example of encapsulation, a pocket may be formed in the rotor segment 10 for receiving the magnet 28 through an open end of the pocket; a cover may close the open end of the pocket to form an enclosure surrounding the magnet 28; and a vacuum bagging process may be used to seal the cover so as to encapsulate the magnet 28 within the rotor segment 10. However, other encapsulation techniques may be used.

The rotor segment 10 may include means for mechanically connecting the rotor segment 10 to other mechanical components. For example, a rotor bracket 30 including rotor bracket apertures 32 may be attached to or formed integrally with the rotor segment 10, as illustrated in FIG. 1. However, other attachment techniques may be used, including threaded recesses in the rotor segment 10 for accepting the end of a threaded fastener, for example.

The rotor segment 10 is depicted in FIG. 1 as having an indefinite length to accommodate a plurality of magnets 28 adjacently arranged and extending generally longitudinally, including being longitudinally offset with respect to each other, within the rotor segment 10. Each magnet 28 is preferably oriented such that a North pole of the magnet 28 is adjacent one stator segment 14 of the pair 12 and a South pole of the magnet 28 opposite the North pole is adjacent the opposing stator segment 14 of the pair 12. Preferably, adjacent magnets 28 within a given rotor segment 10 have opposing orientations such that the polar orientations along each opposing side of the rotor segment 10 alternate between North and South.

Each stator segment 14 includes a stator winding set 34, at least a portion of which is made visible by cut-outs illustrated in FIG. 1. The stator winding set 34 comprises a coil or stator winding 36 and is shown in FIG. 1 as also including a stator core 38 having a projection 40 disposed within the stator winding 36. The stator core 38 is preferably made of a magnetic material, which may be a ferromagnetic material, for increasing the inductance of the stator winding 36. An increased inductance may advantageously permit a greater distance between the magnet 28 and the stator winding 36. In the first embodiment, the stator winding 36 is wound from a single wire having two terminal ends 42 and 43, although a multiple number of wires may additionally be used in each stator winding set 34.

The stator winding set 34 is preferably surrounded by a non-magnetic material such as plastic, rubber, encapsulating resin, low friction material, or a combination thereof, and may be encapsulated within the stator segment 14, including being hermetically sealed within the stator segment 14. A portion of the stator bracket 22 may also be encapsulated within the stator segment 14, and the bracket 22 may be attached to the stator segment 14 by encapsulation thereof. Additionally or alternatively, the bracket 22 may be integral to or formed from the material surrounding the stator winding set 34. The support structure 18 is dimensioned to permit attachment of the stator segments 14 to the support structure 18 such that the rotor segment 10 is permitted to move along the directions 20 and 21.

In the first embodiment, the stator winding set 34 preferably also includes one or more electrical or electronic components electrically connected to the stator winding 36, such as the power factor capacitor 44 electrically connected to the terminal ends 42 and 43 and encapsulated within the stator segment 14. Integrating such one or more electrical components into the stator segment 14 advantageously reduces the complexity and cost of external devices to which the stator segment 14 may be electrically connected.

The one or more electrical components may be located anywhere within the stator segment 14. By way of example, FIG. 1 shows one power factor capacitor 44 beside the stator core 38 opposite the stator winding 36, and one power factor capacitor 44 beside the stator core 38 at one end of the stator winding 36. Other positions for the power factor capacitor 44 or other electrical or electronic components disposed within the stator segment 14 are possible.

The power factor capacitor 44 may be any capacitor compatible with alternating current (AC) power and having a voltage rating sufficiently high to ensure reliable performance. For example, the power factor capacitor 44 may be an electrolytic capacitor, including a dry electrolytic capacitor.

Capacitors including liquid electrolyte in sufficient quantities to harm the encapsulation material of the stator segment 14 if leaked are preferably not used. Integrating the power factor capacitor 44 into a given stator segment 14 may advantageously reduce electrical power loss between the stator segment 14 and external devices to which the stator segment 14 may be electrically connected.

The stator segment 14 is depicted in FIG. 1 as having an indefinite length to accommodate a plurality of stator winding sets 34, adjacently arranged and extending generally longitudinally, including being longitudinally offset with respect to each other, within the stator segment 14. The stator windings 36 of different stator winding sets 34 are preferably at least substantially magnetically decoupled from each other. Different stator winding sets 34, and different stator windings 36, may be electrically connected to each other, such as being connected in series or in parallel, for example.

Magnetically decoupling stator windings 36 of different stator winding sets 34 advantageously reduces or eliminates sensitivity in embodiments of the invention to changes in material and material type located between decoupled stator windings 36, including reducing or eliminating sensitivity to changes in the dielectric of materials located between decoupled stator windings 36, thereby enhancing the effectiveness of embodiments of the invention when used in a variety of different environments, including environments in which embodiments of the invention are fully immersed in water, including sea or ocean water possibly in the presence of plant or other sea life. Accordingly, during fault conditions, such as limited or zero insulation resistance between one or more magnetically decoupled stator windings 36 and the environment (e.g. seawater and/or electrical ground), a minimal impact on total output voltage and total output power is achieved. Magnetically decoupling stator windings 36 of different stator winding sets 34 also advantageously minimizes insulation requirements for conductors forming electrical connections in embodiments of the invention.

When the stator segments 14 are attached to the support structure 18 and the rotor segment 10 moves between the stator segments 14 in either direction 20 or 21 along the support structure 18, an electrical current is induced in the stator windings 36, thereby generating electrical power from mechanical motion. If an electrical current is passed through the stator windings 36 in a given direction, a magnetic force operates on the magnet 28 to urge movement of the rotor segment 10 in a corresponding direction, such as direction 20 for example. An electrical current passing through the stator windings 36 in the opposite direction urges movement of the rotor segment 10 in the opposite direction, such as direction 21 for example. Thus, the first embodiment of the invention is operable as a generator and a motor. Reference herein to a generator will be understood to include reference to a motor.

Figure 2:
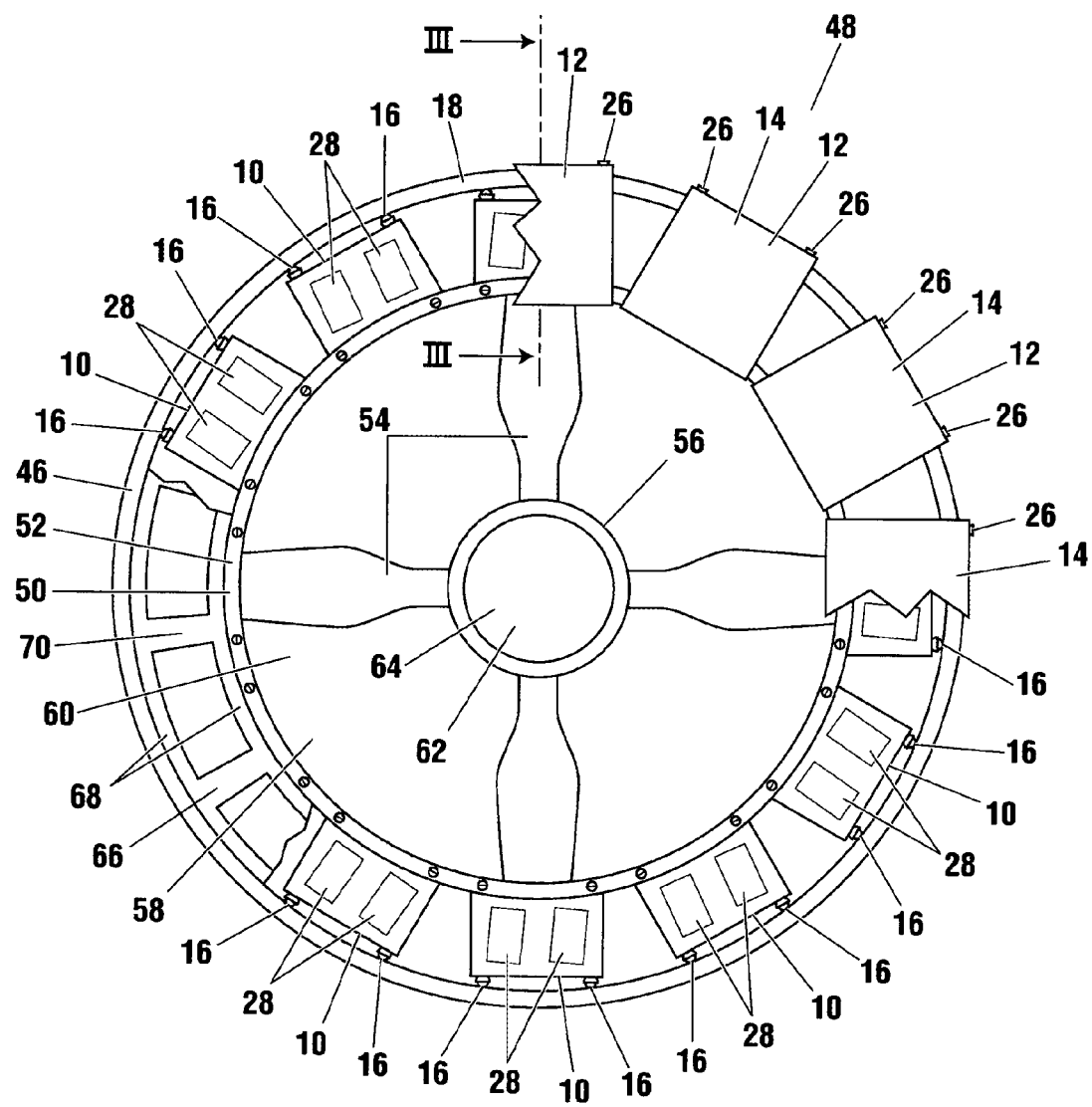
FIG. 2 is a front view of a rim generator incorporating the rotor segment and the pair of stator segments shown in FIG. 1, showing a startup device.
Figure 3:
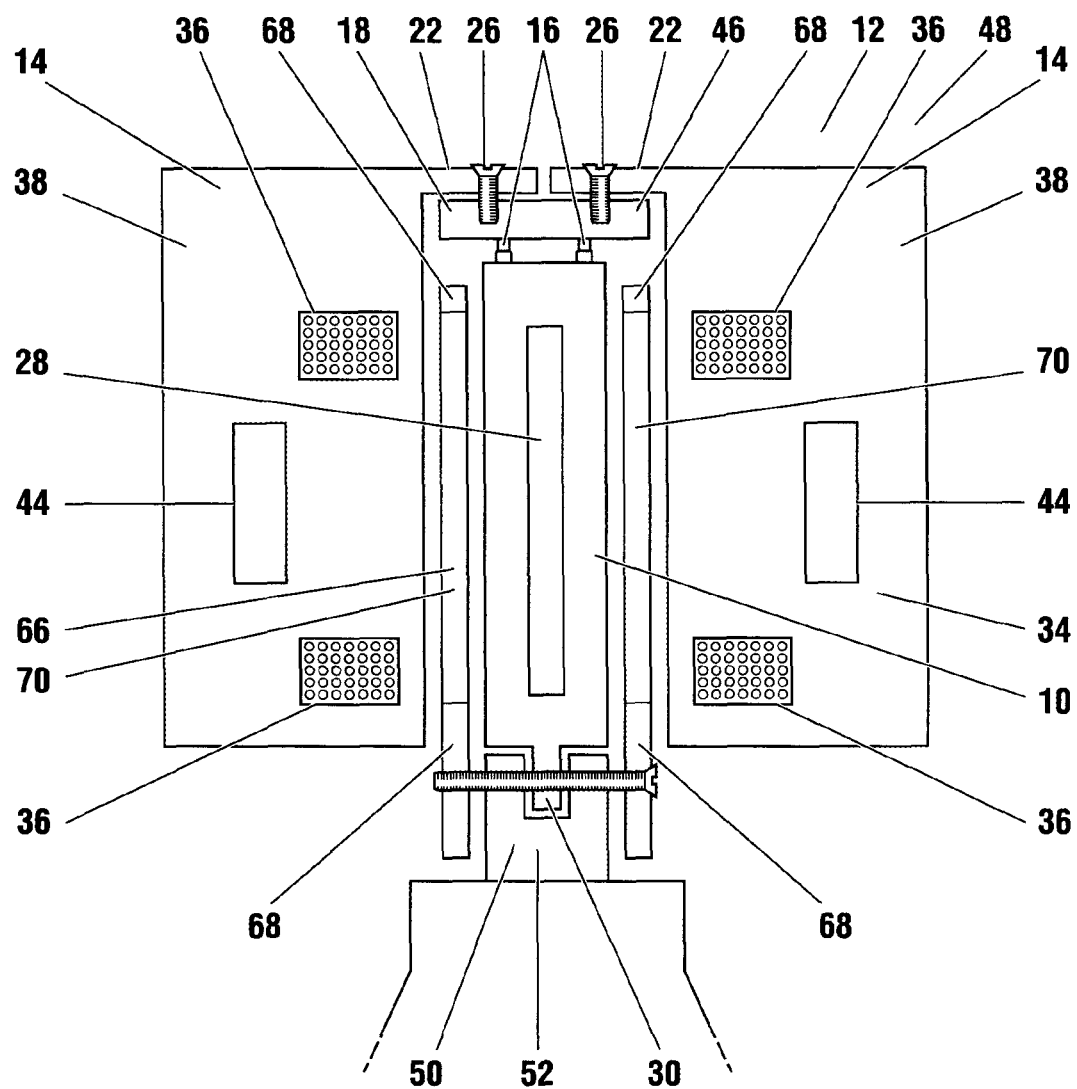
FIG. 3 is a sectional view of the rim generator shown in FIG. 2 along lines III-III, showing the rotor segment disposed between the pair of stator segments.

Referring to FIGS. 2 and 3, the support structure 18, by way of an exemplary use of the rotor segment 10 and the stator segment 14, is a rim 46. The rim 46 and other components described further below form a rim generator 48 for generating electricity. The rim generator 48 may be suitably used to generate AC or direct current (DC) electrical power from the mechanical motion of a fluid medium such as water or air. For example, the rim generator 48 may be located under the surface of an ocean, river or other body of water in the presence of a water current flow. The rim generator 48 is also a motor and may suitably be used as an air fan or water pump, for example. Locating the rim generator 48 in the presence of a water current flow advantageously permits flowing water to cool the rim generator 48 and components thereof, such as the stator segments 14.

The rim generator 48 as illustrated includes a plurality of rotor segments 10 slidably coupled to the rim 46 by bearings 16, and a plurality of pairs 12 of stator segments 14 attached to the rim 46 by fasteners 26. For each pair 12 of stator segments 14, only one stator segment 14 is visible in FIG. 2. FIG. 3 shows a cross-section of a portion of the rim generator 48 along lines of the rim generator 48 shown FIG. 2.

It is understood that the number of rotor segments 10 and pairs 12 of stator segments 14 shown in FIGS. 2 and 3 is merely illustrative of one embodiment of the present invention. The Figures described herein are not necessarily drawn to scale.

Each rotor segment 10 is attached to an annular ring 50 to form an annular rotor 52. One or more blades 54 are attached to the annular ring 50 at its inwardly facing side. The blades 54 may be connected together at the center of the annular ring 50, or may connect to a blade support structure such as the hub 56 shown in FIG. 2. A fluid flow stream 58 entering the entrance 60 of the rim generator 48 flows past the blades 54 to an exit (not shown). The fluid stream 58 causes the blades 54 to rotate, which in turn reduces the energy of the fluid stream 58. When the blades 54 are rotated, the annular ring 50 and the rotor segments 10 rotate, radially about the central axis of the rim generator 48, relative to the stationary rim 46 and stator segments 14. The movement of the rotor segments 10 past the stator segments 14 generates electricity in the manner previously described herein.

The segmented nature of the rotor 52 advantageously facilitates manufacturing, transportation and assembly of the rim generator 48 and its components by permitting the rotor segments 10 to be individually manufactured, tested and shipped near to a deployment location for final assembly. Similarly, the stator segments 14 can be manufactured, tested and assembled individually. Furthermore, maintenance and repair is facilitated by the possibility of removing, installing and/or replacing individual rotor segments 10 and/or individual stator segments 14. The segmented nature of the rotor segment 10 and stator segment 14 components advantageously facilitates assembling a generator and/or motor having a desired distance between the magnets 28 and the stator windings 36, thereby advantageously permitting the distance between the magnets 28 and the stator windings 36 to be selected for optimal energy efficiency.

The segmented nature of the rotor 52 advantageously facilitates the manufacturing, transportation and assembly of large diameter generators and motors, including generators and motors having one or more rotors 52 whose diameters are greater than one (1) metre (approximately 3 feet, 3 inches). The ability to manufacture, transport and assemble generators having one or more large diameter rotors, such as rotor 52, advantageously permits an increase in the number of magnets, such as magnets 28, that can fit along the circumference of the rotor, which advantageously permits an increase in the electrical frequency of the generator output for a given rotational speed of the generator and/or advantageously permits a decrease in rotational speed of the generator necessary to result in a given electrical frequency of the generator output.

In the exemplary embodiment shown in FIG. 2, the rim 46 form of the support structure 18 advantageously obviates any need for the rim generator 48 to include a central shaft. Thus, the hub 56 may have a central hole 62 extending longitudinally through it from the entrance 60 to the exit (not shown) of the rim generator 48. A central fluid flow stream 64 through the longitudinal central hole 62 may advantageously increase the efficiency of the rim generator 48 by reducing turbulence downstream of the rim generator 48 exit where the slower fluid stream 58 rejoins the faster ambient fluid flow stream comprising the central stream 64 and the fluid flow exterior to the rim generator 48 (which fluid streams have not been slowed down by impact with the blades 54).

The rim generator 48 is preferably suitable for synchronous electrical generation and may include a startup device to provide additional torque for rotating the rotor segments 10 during initial startup. In the exemplary embodiment shown in FIGS. 2 and 3, the startup device includes the rotor cage 66. The rotor cage 66 includes a plurality of parallel, spaced apart electrical conductors attached to the annular rotor 52. The exemplary rotor cage 66 is formed from an annular plate made of electrically conductive metal, such as copper, brass, aluminum or a composite material and having a plurality of generally rectangular or arcuate cut-outs spaced apart along the annular plate of the rotor cage 66. The cut-outs form in the rotor cage 66 parallel, spaced apart circularly extending wires 68 and parallel, spaced apart braces 70 extending between the wires 68 to support and maintain the separation between the wires 68. The rotor cage 66 may include a plurality of such annular plates, including a pair of annular plates (see FIG. 3) disposed on either side of the rotor segments 10, for example. Although not entirely shown in FIG. 2, each wire 68 of the rotor cage 66 preferably extends around the entire circumference of the annular rotor 52 to form an endless loop. Similarly, the braces 70 preferably are disposed at intervals around the entire circumference of the annular rotor 52. Other techniques for assisting initial movement of the stator segments 10 may be used. For example, the rotor cage 66 may be made of wires or rods connected together rather than stamped cut-outs in an annular plate.

FIG. 2 shows a cut-out illustration of an interior portion of one rotor segment 10, showing magnets 28 disposed at a skewing angle relative to the shape of the rotor segment 10 and, consequently relative to the positions of the stator windings 36 within the stator segments 14. Skewing the magnet 28 may advantageously reduce the peak cogging torque resulting from the movement of the rotor segments 10 relative to the stator segments 14. Different rotor segments 10 may include a plurality of magnet 28 angled at the same skewing angle or different skewing angles. Magnets 28 of different rotor segments 10 may have be angled at the same skewing angle or different skewing angles. All magnets 28 within a given rim generator 48 may be skewed at the same angle.

In some embodiments, the bearings 16 are located other than as shown in FIGS. 2 and 3. For example, the rotor 52 may be supported on bearings located adjacent the annular ring 50. In some embodiments, the rotor segments 10 are attached to the support structure 18 and slidably coupled by bearings to the annular ring 50, and the stator segments 14 are attached to the annular ring 50 and slidably coupled to the support structure 18 such that rotation of the annular ring 50 causes the stator segments 14 to move past the fixed rotor segments 10, for example. It is understood that the arrangement and location of bearings of the embodiments described and illustrated herein are merely exemplary. Other embodiments having various mechanical arrangements of the bearings 16, rotor segments 10, stator segments 14 and support structure 18 will occur to those skilled in the art and are contemplated within the scope the present invention.

Figure 4:
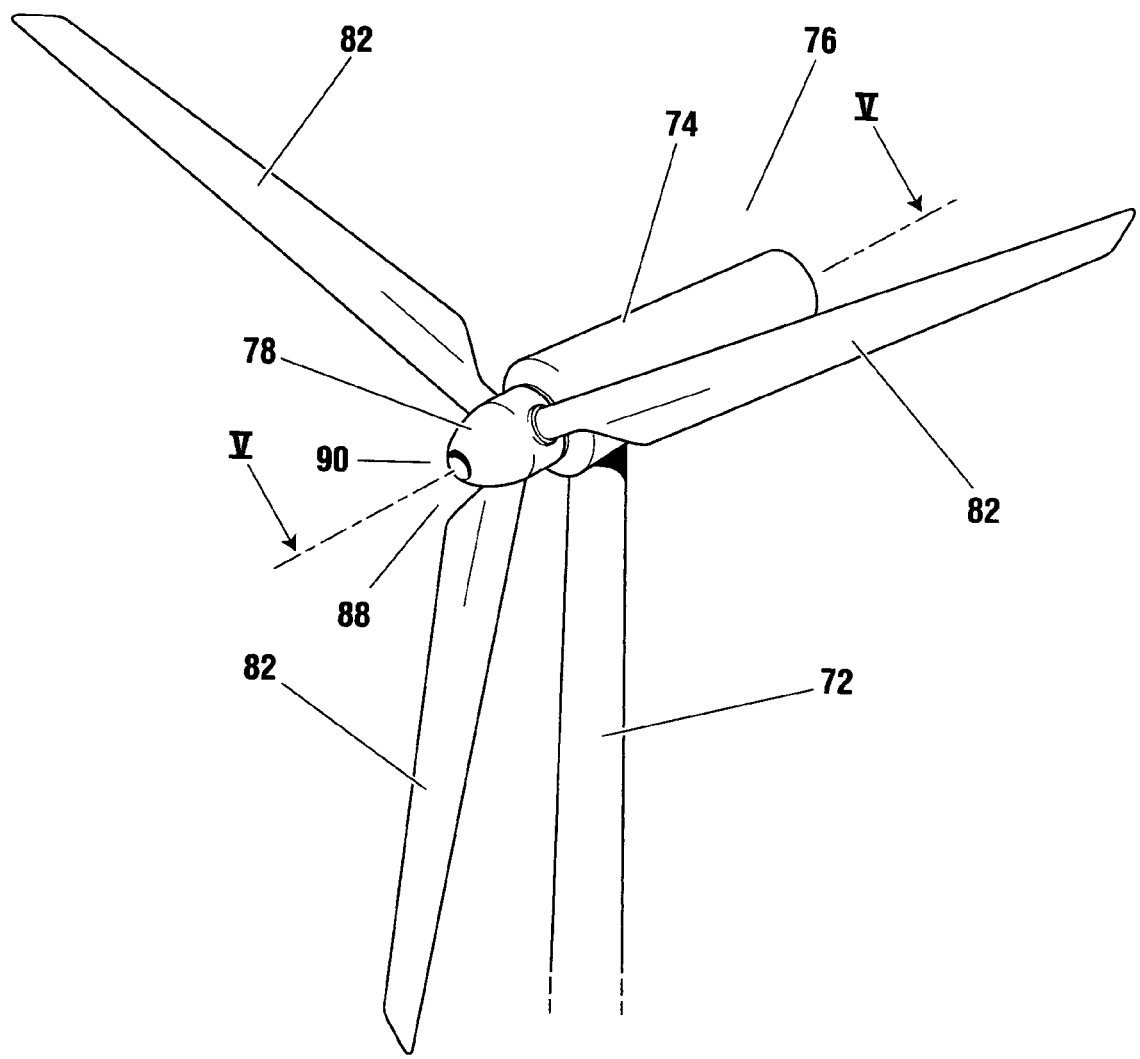
FIG. 4 is a perspective view of a wind turbine generator incorporating the rotor segment and the pair of stator segments shown in FIG. 1, showing a blade support hub having a hole therethrough.
Figure 5:
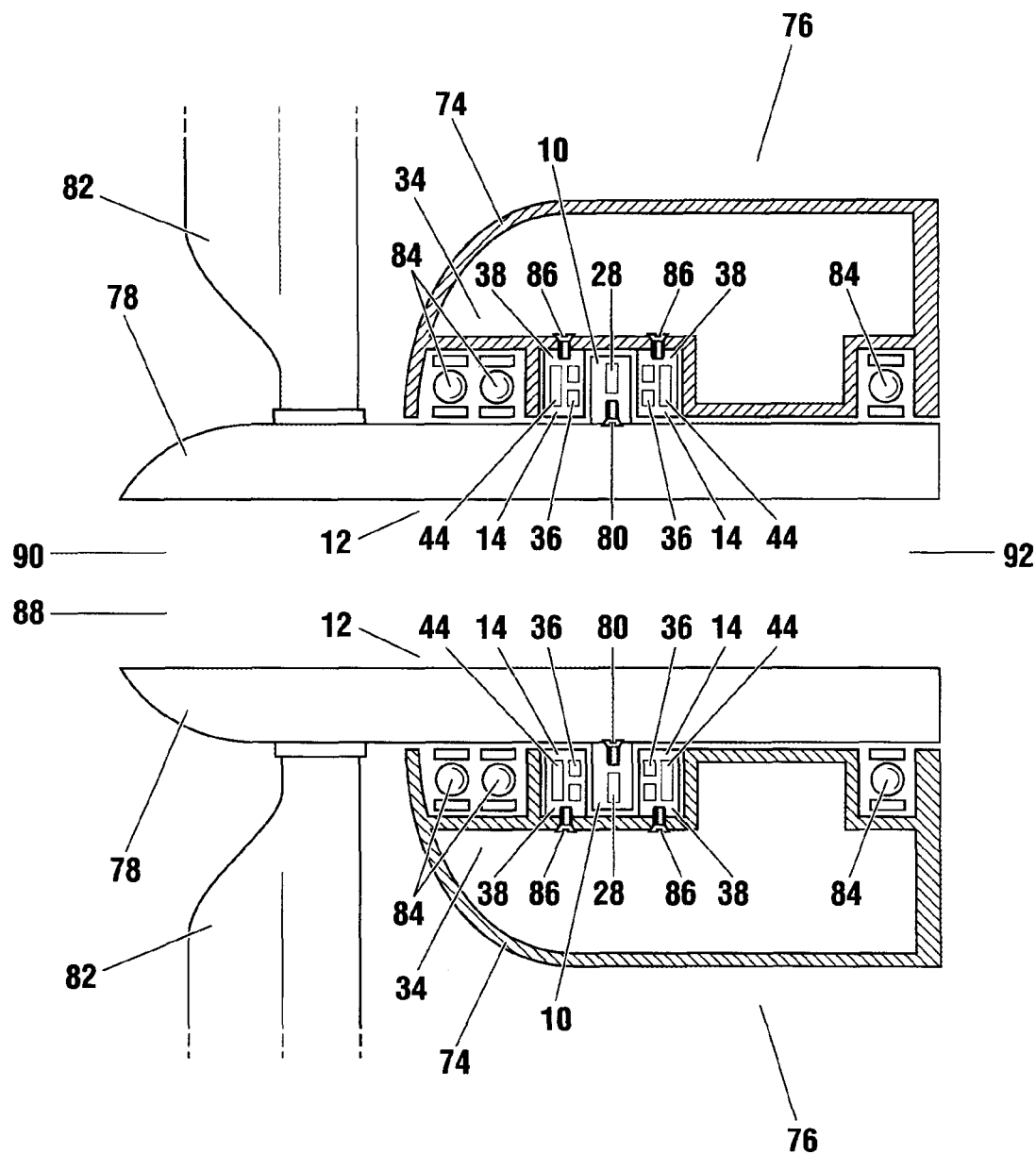
FIG. 5 is a sectional view of the wind turbine generator shown in FIG. 4 along lines V-V, showing the rotor segment disposed between the pair of stator segments.

Referring to FIGS. 4 and 5, the support structure 18 may include a pedestal 72 and nacelle 74 for supporting a generator or motor incorporating the rotor segment 10 and the pair 12 of the stator segments 14. For example, the pedestal 72 and nacelle 74 may support the exemplary wind turbine generator 76 illustrated in FIG. 4. FIG. 5 shows a cross-section along lines V-V of the wind turbine generator 76 shown in FIG. 4.

The rotor segment 10 in accordance with the first embodiment is disposed between the pair 12 of the stator segments 14, also in accordance with the first embodiment. The rotor segment 10 includes at least one magnet 28 and is attached at one end thereof to a blade support hub 78. FIG. 5 shows the exemplary rotor segment 10 attachment fastener 80 threaded into a threaded aperture of the rotor segment 10 as an exemplary attachment technique, however, the rotor segment 10 may be attached to the blade support hub 78 by any suitable technique or method, including the technique best seen in FIGS. 1 and 3. Wind turbine blades 82 are attached to the blade support hub 78 at its front end. The blade support hub 78 is rotatably coupled to the nacelle 74 by bearings 84, which are exemplified in FIG. 5 as roller-type bearings. However, the present invention encompasses all suitable bearing types and arrangements.

The pair 12 of stator segments 14 may be attached to the nacelle 74 by any suitable attachment technique or method, including by the exemplary stator segment 10 attachment fasteners 86 shown in FIG. 5. Each stator segment 14 includes one or more stator winding sets 34, each of which includes the stator winding 36 and is shown in FIG. 5 as including one power factor capacitor 44. Additionally or alternatively, the stator winding set 34 may include other electrical or electronic components (not shown). Additionally or alternatively, the nacelle 74 may house other electrical, mechanical or other components (not shown) for use in or with the wind turbine generator 76.

Additionally, a plurality of rotor segments 10 (not visible in FIGS. 4 and 5) may be adjacently arranged about the longitudinal axis of the blade support hub 78 to form the annular rotor 52, for example. The wind turbine generator 76 may include a plurality of parallel, spaced apart rotors 52 (not shown) between the stator segments 14 of a given pair 12 or between pairs 12 of the stator segments 14, including being interleaved between stator segments 14 or pairs 12 of stator segments 14. Similarly, a plurality of pairs 12 (not visible in FIGS. 4 and 5) of stator segments 14 may be adjacently arranged about the longitudinal axis of the blade support hub 78.

When wind or other air current flowing past the wind turbine generator 76 causes the blades 82 to rotate, the blade support hub 78 and all rotor segments 10 attached to the blade support hub 78 also rotate relative to the nacelle 74 and all stator segments 14 attached to the nacelle 74. Thus, the rotor segment 10 is slidably coupled to the stator segment 14, and the rotor segments 10 attached to the blade support hub 78 are operable to move radially about the longitudinal axis of the blade support hub 78. The movement of the rotor segment 10 past the stator segment 14 generates electricity in the manner previously described herein. The wind turbine generator 76 is also a motor and may be used as an air fan, for example.

As shown in FIGS. 4 and 5, a wind turbine hole 88 extends longitudinally through the blade support hub 78 from the entrance 90 to the exit 92 of the hub 78. The blade support hub 78 need not include the wind turbine hole 88 and, additionally or alternatively, the wind turbine generator 76 may include a central shaft (not shown). Wind turbine generator 76 applications that include the wind turbine hole 88 may advantageously have increased efficiency due to reduced turbulence downstream of the exit of the blade support hub 78.

Although not illustrated in the Figures, the wind turbine generator 76 may additionally include a startup device, such as one or more rotor cages 66, which may be incorporated into the wind turbine generator 76 in a manner similar or analogous to that previously described herein in respect of the rim generator 48.

Figure 6:
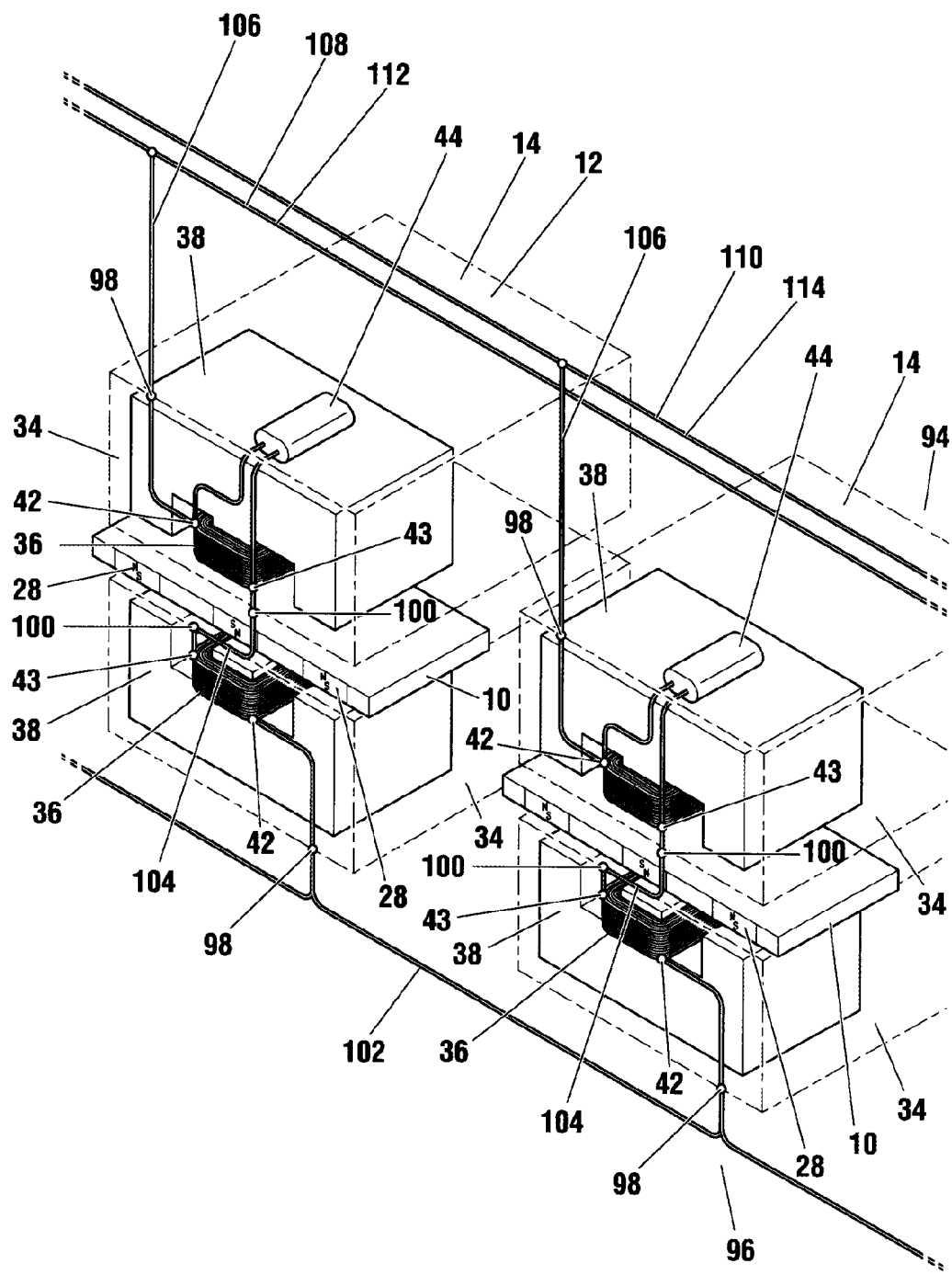
FIG. 6 is a block and schematic representation of electrical connections of an AC generator incorporating the rotor segment and the pair of stator segments shown in FIG. 1, showing adjacent magnets oriented for opposing polarities.

FIG. 6 shows electrical connections for generating an AC output in accordance with the first embodiment of the invention. A portion of a generator and/or motor, which could be the rim generator 48 of FIGS. 2 and 3 or the wind turbine generator 76 of FIGS. 4 and 5, for example, is indicated in FIG. 6. Each rotor segment 10 shown in FIG. 6 includes the exemplary number of three magnets 28 adjacently arranged and extending generally longitudinally within the rotor segment 10 such that the polar orientations along each opposing side of the rotor segment 10 alternate between North (indicated in FIG. 6 by the letter "N") and South (indicated in FIG. 6 by the letter "S"). Each rotor segment 10 is disposed between the stator segment 14 of a given pair 12 on a first side 94 and the opposing stator segment 14 of the given pair 12 on a second side 96 opposite the first side 94.

The terminal ends 42 and 43 of the stator windings 36 are electrically connected to first and second stator segment connectors 98 and 100 for making electrical connections external to the stator segments 14, respectively.

The terminal ends 42 and 43 of the first side 94 are also connected to the pair of terminals of the power factor capacitor 44, which is shown encapsulated within the stator segments 14 of the first side 94 in FIG. 6. Additionally or alternatively, other electrical or electronic components may be encapsulated within the stator segments 14 of the first side 94 or the second side 96, including a plurality of stator winding sets 34.

The first stator segment connectors 98 of the second side 96 are connected to each other to form a single conductor, which may be referred to as the Neutral conductor 102.

The second stator segment connectors 100 of each pair 12 of stator segments 14 are electrically connected to each other, and preferably are connected via electrical wiring 104 supported by the support structure 18.

An AC output 106 appears at the first stator segment connector 98 of each stator segment 14 of the first side 94. The AC output 106 of different pairs 12 of stator segments 14 may have the same or different phase. In the example illustrated in FIG. 6, the AC output 106 of one visible pair 12 of stator segments 14 has a first phase 108 and the AC output 106 of the other visible pair 12 of stator segments 14 has a second phase 110. Typically, AC outputs 106 having different phases are not directly electrically connected. However, all AC outputs 106 of the generator partially shown in FIG. 6 having the first phase 108 may be electrically connected by parallel connection to form the first phase AC output 112, and all AC outputs having the second phase 110 may be electrically connected by parallel connection to form the second phase AC output 114. In embodiments where three AC outputs 106 having three distinct phases (not shown) are produced, the generator may be considered to produce a three-phase output.

The parallel connection of AC outputs of the pairs 12 of stator segments 14 provides a fault-tolerance feature in which the loss of output from an individual pair 12 due to disconnection does not result in total loss of output for an entire generator. Reliability is improved by the possibility of removing, installing and/or replacing individual rotor segments 10 and stator segments 14.

Electrical connections described herein, including those connecting pairs 12 of stator segments 14 in parallel with each other, advantageously facilitate a feature of voltage self-compensation in which variations in AC outputs 106 having a given phase (e.g. first phase 108, second phase 110 or other phase) are minimized due to the connection of the second stator segment connectors 100 of each pair 12 of stator segments 14. As a given rotor segment 10 passes the stator segments 14 of a given pair 12, any mechanical deviation from center in which the given rotor segment 10 is distant from one stator segment 14 of the given pair 12 is matched by the given rotor segment 10 being correspondingly closer to the other stator segment 14 of the given pair 12. A diminished voltage produced at one stator segment 14 of the given pair 12 is compensated by a correspondingly increased voltage produced at the other stator segment 14. The series connection of the stator segments 14 of the given pair 12 results in the given pair 12 producing an output voltage from the sum of the output voltages produced by each stator segment 14 of the given pair 12, thereby minimizing variations between output voltages produced by different pairs 12.

Figure 7:
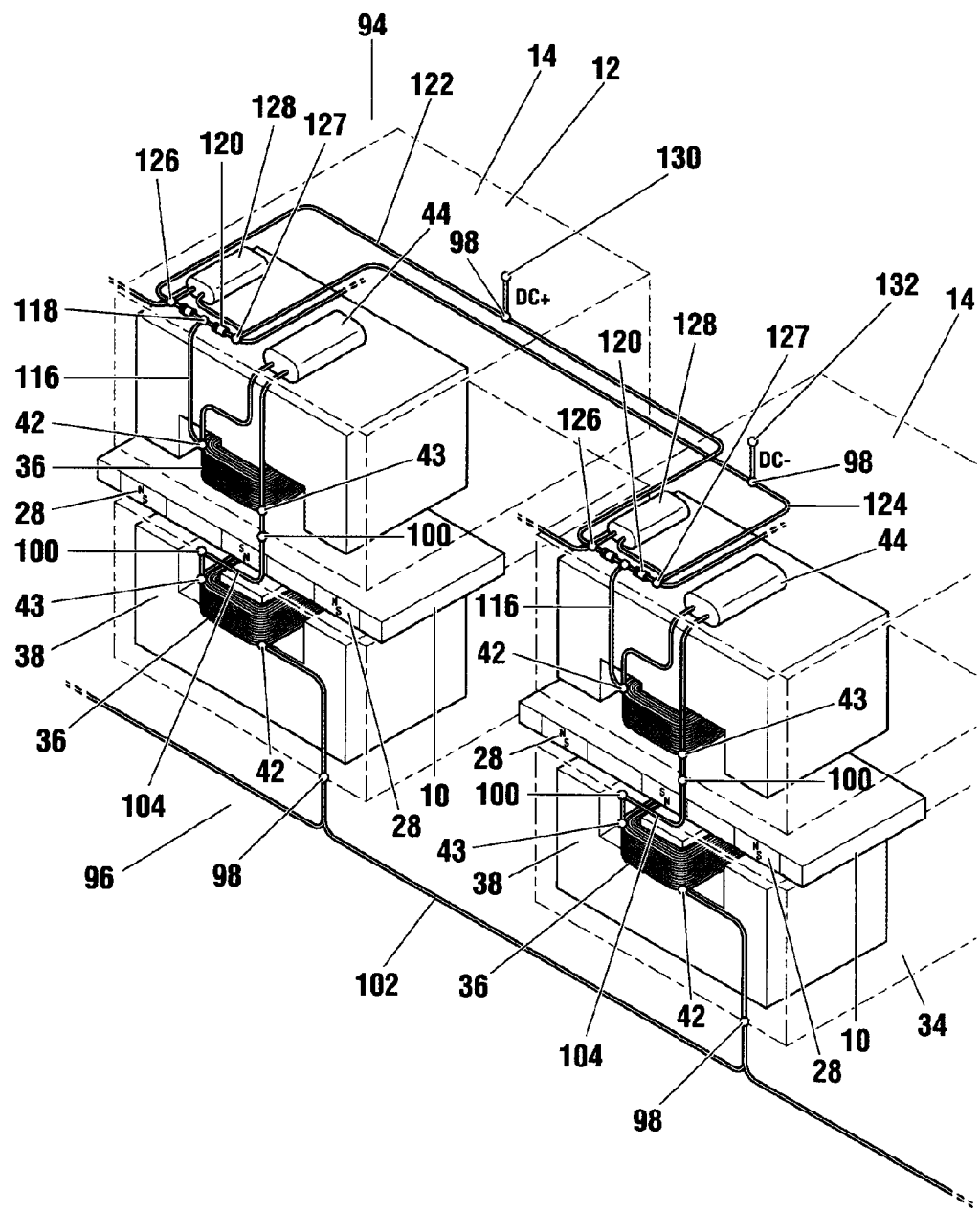
FIG. 7 is a block and schematic representation of electrical connections of a DC generator incorporating the rotor segment and the pair of stator segments shown in FIG. 1, showing a diode-pair rectifier and a filter capacitor.

FIG. 7 shows electrical connections for generating a DC output in accordance with the first embodiment of the invention. The portion of a generator and/or motor shown in FIG. 6 is also shown in FIG. 7, including three magnets 28 adjacently arranged and extending generally longitudinally within each rotor segment 10 such that the polar orientations along each opposing side of the rotor segment 10 alternate between North (indicated in FIG. 7 by the letter "N") and South (indicated in FIG. 7 by the letter "S"). Each rotor segment 10 is disposed between the stator segment 14 of the given pair 12 on the first side 94 and the opposing stator segment 14 of the given pair 12 on the second side 96. Connectors 98 and 100 are suitable for making electrical connections external to the stator segments 14.

The terminal ends 42 and 43, the power factor capacitor 44, the Neutral conductor 102, the electrical wiring 104 are connected similarly in both FIGS. 6 and 7.

An intermediate AC output 116 (similar to the AC output 106 shown in FIG. 6) is produced at the terminal end 42 of each stator segment 14 of the first side 94. The intermediate AC output 116 is connected to the intermediate diode node 118 of a series-connected diode pair 120, which preferably, but not necessarily, is included in the stator winding set 34 and encapsulated within the stator segment 14. The diode pair 120 is operable to rectify the intermediate AC output 116 to produce, at opposing ends of the diode pair 120, a DC positive power signal 122 and a DC negative power signal 124. DC connectors 126 and 127 provide the positive and negative DC power signals 122 and 124 externally to the stator segments 14, respectively. Each diode of the diode pair 120 may be a silicon diode, for example.

A DC filtering capacitor 128 is preferably connected across the diode pair 120 for reducing the amount of ripple in the DC power signals 122 and 124. The DC filtering capacitor 128 is preferably, but not necessarily, included in the stator winding set 34 and encapsulated within the stator segment 14.

The DC power signals 122 and 124 of a given stator segment 14 may be connected in parallel or in series to the DC power signals 122 and 124 of one or more other stator segments 14. In the example shown in FIG. 7, all DC positive power signals 122 are preferably connected to each other and all DC negative power signals 124 are preferably connected to each other so as to effect parallel connection of the DC power signals 122 and 124. Thus, an overall DC positive output 130 may be obtained from the DC positive power signal 122 available at any given DC connector 126, and an overall DC negative output 132 may be obtained from the DC negative power signal 124 available at any given DC connector 127.

Figure 8:
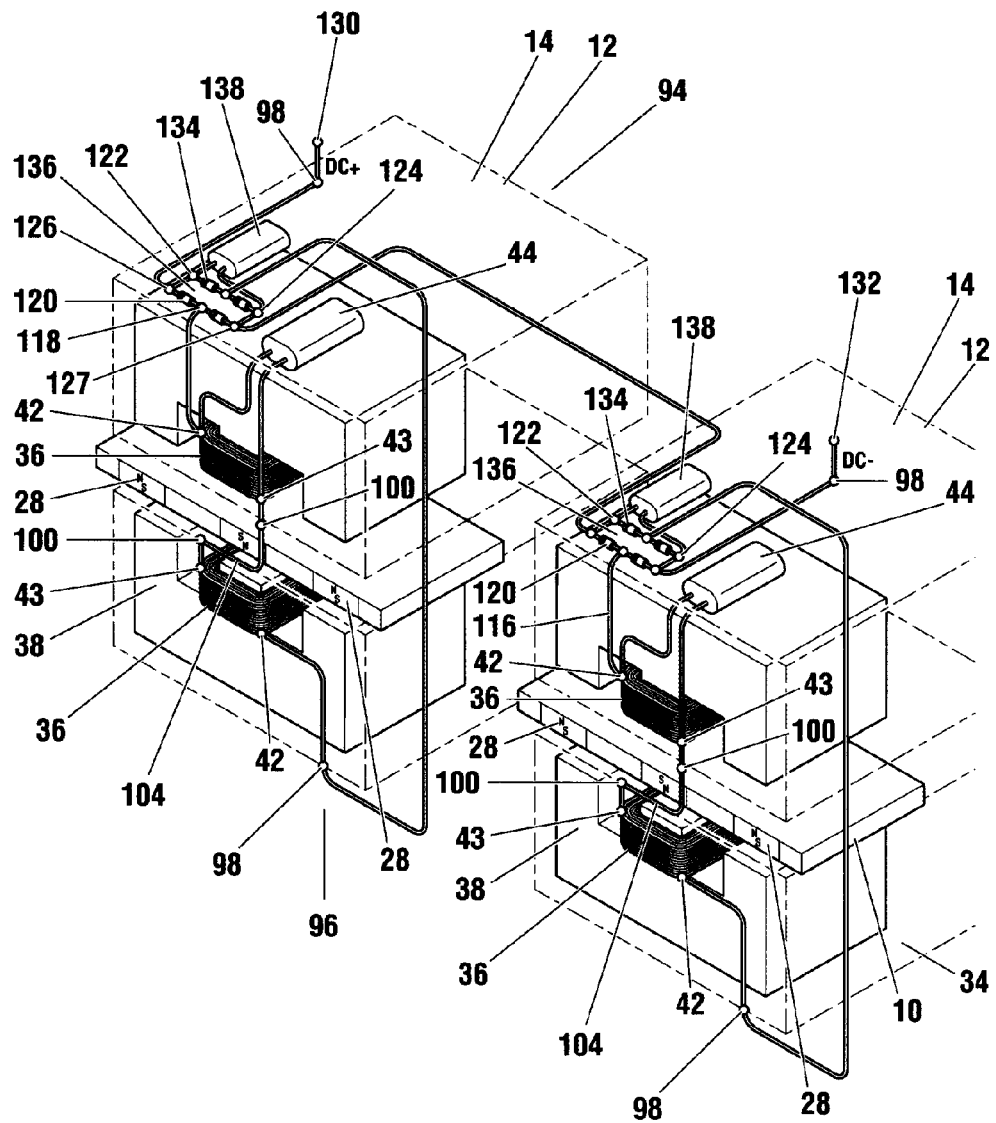
FIG. 8 is a block and schematic representation of electrical connections of a DC generator incorporating the rotor segment and the pair of stator segments shown in FIG. 1, showing a diode bridge rectifier and a supercapacitor.

FIG. 8 shows electrical connections for generating a DC output in accordance with the first embodiment of the invention, which are particularly suited to applications involving low voltage DC filtering at each pair 12 of stator segments 14. The portion of a generator and/or motor shown in FIGS. 6 and 7 is also shown in FIG. 8, including three magnets 28 adjacently arranged and extending generally longitudinally within each rotor segment 10 such that the polar orientations along each opposing side of the rotor segment 10 alternate between North (indicated in FIG. 8 by the letter "N") and South (indicated in FIG. 8 by the letter "S"). Each rotor segment 10 is disposed between the stator segment 14 of the given pair 12 on the first side 94 and the opposing stator segment 14 of the given pair 12 on the second side 96. Connectors 98 and 100 are suitable for making electrical connections external to the stator segments 14.

The terminal ends 42 and 43, the power factor capacitor 44, the electrical wiring 104 are connected similarly in FIGS. 6, 7 and 8. The intermediate AC output 116 is connected to the intermediate diode node 118 of the series-connected diode pair 120. A second series-connected diode pair 134 is connected in parallel with the diode pair 120. The second diode pair 134 is preferably, but not necessarily, included in the stator winding set 34 and encapsulated within the stator segment 14. The four diodes of the diode pairs 120 and 134 form a rectifying diode bridge 136 for rectifying the intermediate AC output 116 to produce, at opposing ends of the diode bridge 136, the DC positive power signal 122 and the DC negative power signal 124 provided externally by the DC connectors 126 and 127, respectively.

The DC positive power signal 122 of the rightmost pair 12 of stator segments 14 is externally connected to the DC negative power signal 124 of the adjacent leftmost pair 12. For the purpose of exemplary illustration in FIG. 8, the DC positive power signal 122 of the leftmost pair 12 becomes the overall DC positive output 130, and the DC negative power signal 124 of the rightmost pair 12 becomes the overall DC negative output 132. In cases where a greater number of pairs 12 of stator segments 14 are involved in producing the overall outputs 130 and 132, the series connections of DC positive power signals 122 to DC negative power signal 124 of an adjacent pair 12 continues. At terminal ends of the series-connected pairs 12 of stator segments 14, the overall outputs 130 and 132 may be obtained.

The series connection of DC power signals is particularly suited for applications involving the use of DC filtering capacitors having a rated maximum voltage capacity which is low, including DC filtering capacitors having a rated maximum voltage capacity of less than five volts. Such low voltage capacitors may include supercapacitors, ultracapacitors, or electrochemical double layer capacitors, for example, such as the low voltage DC capacitor 138 shown in FIG. 8. Each low voltage DC capacitor 138, preferably encapsulated within one pair 12 of stator segments, is operable to reduce the amount of ripple in the DC power signals 122 and 124 of that pair 12. The series connection of the pairs 12 of stator segments 14 permits the voltage level of the overall DC outputs 130 and 132 to be much greater than the DC voltage levels produced by each individual pair 12 of stator segments 14, to which the low voltage capacitors 138 are subjected.

Figure 9:
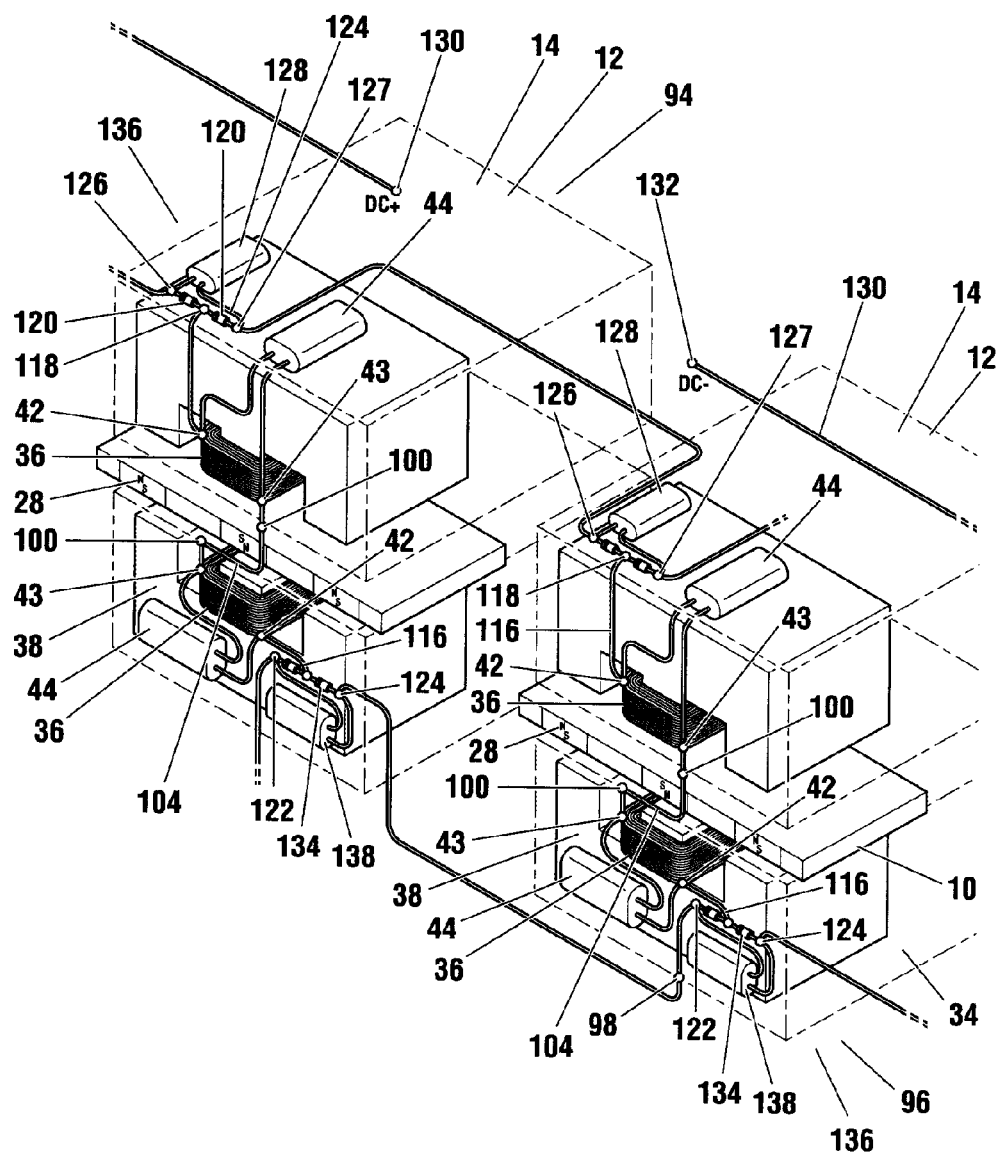
FIG. 9 is a block and schematic representation of electrical connections of a DC generator incorporating the rotor segment and the pair of stator segments shown in FIG. 1, showing the same stator winding set for each stator segment of the pair of stator segments.

FIG. 9 shows a variation of the electrical connections shown in FIG. 8, in which each stator segment 14 of each pair 12 is identical. In the variation of FIG. 9, one AC power factor capacitor 44, one diode pair 120 forming half of the diode bridge 136, and one low voltage DC filtering capacitor 138 is disposed within one stator segment 14 of each pair 12 of stator segments 14. For illustrate purposes, FIG. 9 shows the external series connections forming the overall DC outputs 130 and 132 at the first side 94 as including an indefinite number of series connected DC positive and negative power signals 122 and 124. A similar series connection at the second side 96 produces positive and negative DC outputs (not shown) which may be combined in parallel with the overall DC output 130 and 132, thereby improving reliability and enhancing fault-tolerance. The variation shown in FIG. 9 advantageously permits identical stator segments 14 to be manufactured and used, thereby reducing manufacturing and assembly costs.

Second Embodiment

Figure 10:
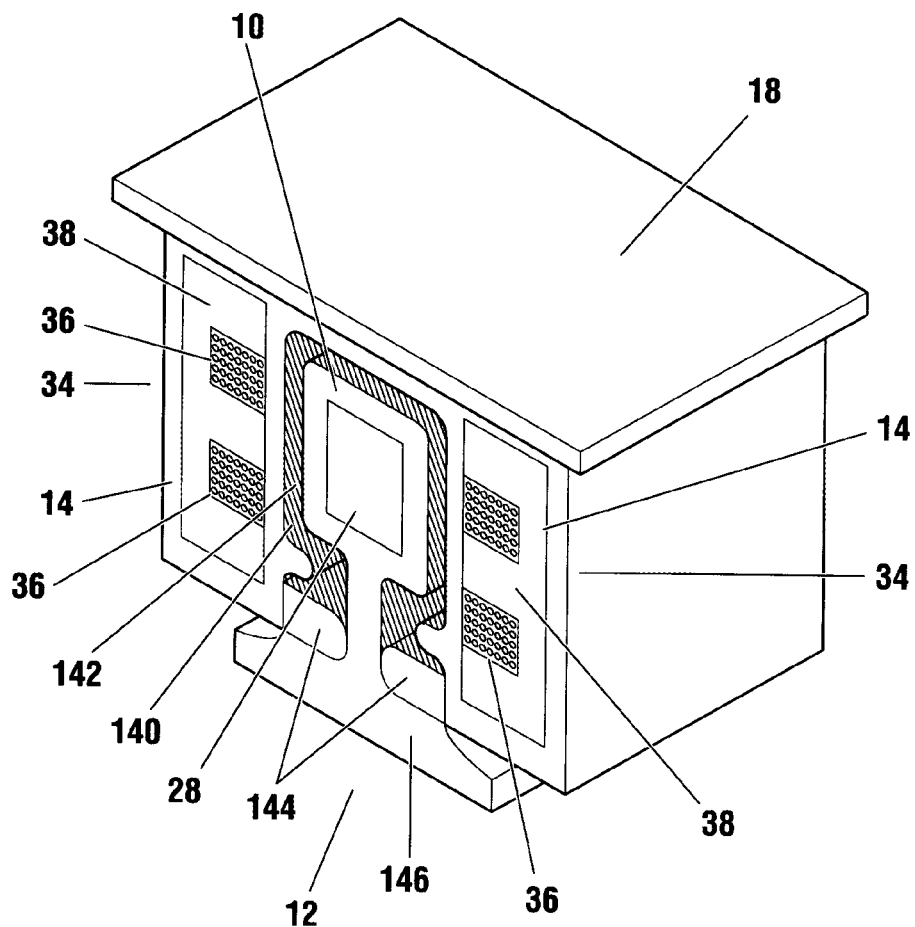
FIG. 10 is a perspective sectional view of a rotor segment disposed between a pair of stator segments according to a second embodiment of the invention, showing a seal and lubricant for slidably coupling the rotor segment to the stator segment.

FIG. 10 shows the rotor segment 10 disposed between the stator segments 14 of the pair 12 in accordance with a second embodiment of the invention. The stator segments 14 may be integrally formed as a single unit, as shown in FIG. 10, or may be separated and attached to each other or attached to the support structure 18. A fluid, such as the fluid lubricant 140 shown in FIG. 10, fills the gap 142 between the rotor segment 10 and the pair 12 of stator segments 14. A pair of seals 144 disposed on either side of the rotor segment 10 in the gap 142 prevent leakage of the fluid lubricant 140. The fluid lubricant 140 is used to slidably couple the rotor segment 10 and the pair of stator segments 14 such that the rotor segment 10 is operable to move relative to the pair of stator segments 14 without contacting either stator segment 14. The fluid lubricant 140 may be under pressure to prevent contact between the rotor segment 10 and either stator segment 14. At least at the outer surface of the rotor segment 10 and the stator segments 14 which may make contact with the fluid lubricant 140, the rotor segment 10 and the stator segments 14 are preferably made of a low friction material, including a low friction encapsulation material, to complement the lubricating qualities of the fluid lubricant 140.

The support structure 18 shown in FIG. 9 may take other shapes and sizes, and thereby form portions of a generator and/or motor, including a generator similar to those previously described herein with appropriate substitution of components and necessary modifications as understood by a person of ordinary skill in the art. The rotor segment 10 may attach at its lower portion 146 to other components of a generator and/or motor, such as attaching to the rim 32 of the rim generator 48 or the blade support hub 78 of the wind turbine generator 76.

While specific embodiments of the invention have been described and illustrated, such embodiments should be considered illustrative of the invention only. The invention may include variants not described or illustrated herein in detail. For example, various features described in the context of one application of one embodiment of the present invention may be applied to other applications and other embodiments of the invention. Thus, the embodiments described and illustrated herein should not be considered to limit the invention as construed in accordance with the accompanying claims.

What is claimed is:
1. An electromechanical apparatus, the apparatus comprising:
   (a) a first pair and a second pair of substantially parallel and spaced apart stator segments, each of said first and second pairs of stator segments comprising first and second stator segments, each stator segment of said first and second pairs comprising a stator winding; and
   (b) a plurality of rotor segments slidably coupled between said first and second pairs of stator segments, said rotor segments comprising a plurality of magnets, wherein each said magnet of said plurality is arranged such that a polar orientation of each said magnet alternates with respect to a polar orientation of an adjacent said magnet;
   wherein said pairs of stator segments form a channel, and said rotor segments form a train operable to move within said channel; and wherein said first and second pairs of stator segments are substantially magnetically decoupled from each other; and wherein each said stator segment is physically separate from each other of said stator segments.

2. The apparatus according to claim 1, wherein each said stator winding in each said stator segment is substantially magnetically decoupled from each other of said stator windings.

3. The apparatus according to claim 1, wherein each said stator segment is substantially thermally decoupled from each other of said stator segments.

4. The apparatus according to claim 1, wherein each said rotor segment comprises a plurality of magnets.

5. The apparatus according to claim 1, said rotor segments comprising a first rotor segment, and additionally comprising a second rotor segment comprising at least one magnet, wherein said first and second rotor segments are substantially parallel and axially disposed to each other, and slidably coupled between said first and second pairs of stator segments.

6. The apparatus according to claim 1, wherein said pairs of stator segments form a circumferential channel, and said rotor segments form an annular train operable to move within said channel.

7. The apparatus according to claim 6, said plurality of said rotor segments comprising a first annular train, and further comprising a second plurality of said rotor segments forming a second annular train operable to move within said channel, wherein said first and second annular trains of said rotor segments are substantially parallel and axially disposed to each other.

8. The apparatus according to claim 1, wherein a first distance between said rotor segments and said first stator segments of said first and second pairs is greater than a second distance between said rotor segments and said second stator segments of said first and second pairs.

9. The apparatus according to claim 1, wherein said first pair of said stator segments comprises a first phase of said apparatus, and wherein said second pair of said stator segments comprises a second phase of said apparatus.

10. A method of producing an electromechanical apparatus, the method comprising:
(a) manufacturing a plurality of pairs of substantially parallel and spaced apart stator segments, each said pair of stator segments comprising first and second stator segments, each stator segment of said each pair comprising a stator winding;
(b) manufacturing a plurality of a rotor segments, wherein each said rotor segment is dimensioned to fit between said each pair of stator segments, said each rotor segment comprising at least one magnet;
(c) assembling said plurality of pairs of stator segments to form a circumferential channel, wherein each said pair of stator segments are substantially magnetically decoupled from each other said pair, and each said stator segment is physically separate from each other of said stator segments; and
(d) assembling said plurality of rotor segments to form an annular train of said rotor segments slidably coupled to said plurality of pairs of stator segments and operable to move through said channel.

11. The method according to claim 10, wherein said step of manufacturing a plurality of rotor segments comprises encapsulating each said rotor segment in encapsulating material.

12. The method according to claim 10, wherein said step of manufacturing a plurality of pairs of stator segments comprises encapsulating each said stator segment in encapsulating material.

13. The method according to claim 12, wherein said step of encapsulating each said stator segment comprises at least one of: an output electrical component; a capacitor; and a diode; with each said first stator segment of each said pair.

14. The method according to claim 10, wherein said step of assembling said plurality of pairs of stator segments comprises attaching said plurality of pairs of stator segments to a support structure of said apparatus.

15. The method according to claim 10, wherein said step of assembling said plurality of rotor segments further comprises assembling said plurality of rotor segments to form first and second annular trains of said rotor segments, wherein said first and second annular trains are substantially parallel and axially disposed to each other, and are slidably coupled to said plurality of pairs of stator segments and are operable to move through said channel.

16. The method according to claim 10, additionally comprising selecting a first distance between said magnets of said rotor segments and said first stator segments of said plurality of pairs of stator segments, and selecting a second distance between said magnets of said rotor segments and said second stator segments of said plurality of pairs of stator segments.

17. The method according to claim 16, wherein said first distance is greater than said second distance.

\* \* \* \* \*